2 Sheets--Sheet 1.

E. N. LACROIX.

Middlings-Purifiers.

No. 5,711. Reissued Dec. 30, 1873.

WITNESSES.

W. T. Newman

Wm. H. Brereton Jr.

INVENTOR

Edmund N. Lacroix

By Legg & Legg

Attorneys.

2 Sheets--Sheet 2.

E. N. LACROIX.
Middlings-Purifiers.

No. 5,711. Reissued Dec. 30, 1873.

WITNESSES.

W. D. Newnam,

Wm. H. Brewster Jr.

INVENTOR

Edmund N. Lacroix

By Leggett & Leggett

Attorneys.

UNITED STATES PATENT OFFICE.

EDMUND N. LACROIX, OF MINNEAPOLIS, MINNESOTA.

IMPROVEMENT IN MIDDLINGS-PURIFIERS.

Specification forming part of Letters Patent No. 139,585, dated June 3, 1873; reissue No. 5,711, dated December 30, 1873; application filed October 31, 1873.

*To all whom it may concern:*

Be it known that I, EDMUND N. LACROIX, of Minneapolis, in the county of Hennepin and State of Minnesota, have invented certain new and useful Improvements in Middlings-Separators, of which the following is a specification:

My invention consists, essentially, in combining with the separating screen or screens, a reciprocating air tube or tubes, so arranged as to concentrate a narrow blast upon the said screens, and thereby open the meshes, and to stir up the material on top; it also consists in combining with the air-tubes flexible air-pipes, which travel with the tubes and supply the blast; and it furthermore consists in combining, with the traveling air-tubes, an arrangement for shifting or alternating the motion of the air-tubes, as hereinafter described.

Figure 1:
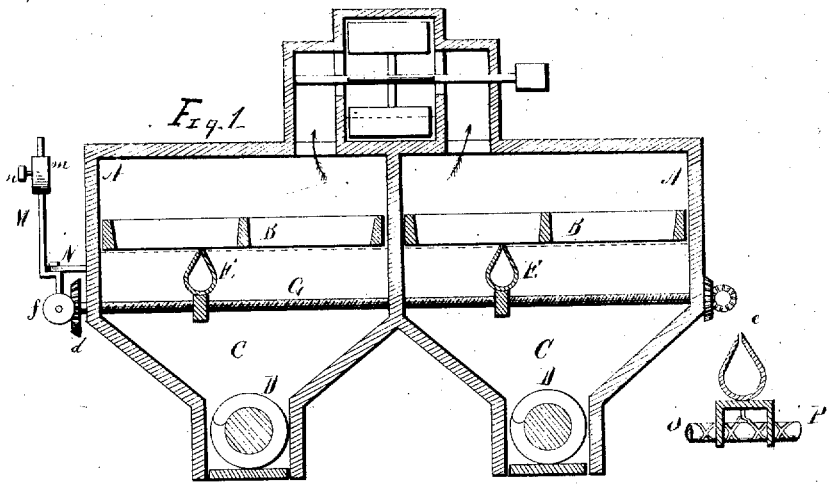
Figure 2:
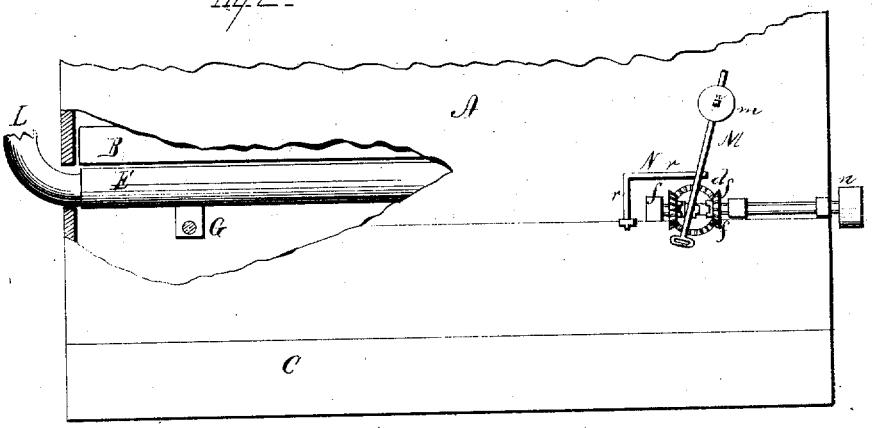
Figure 3:
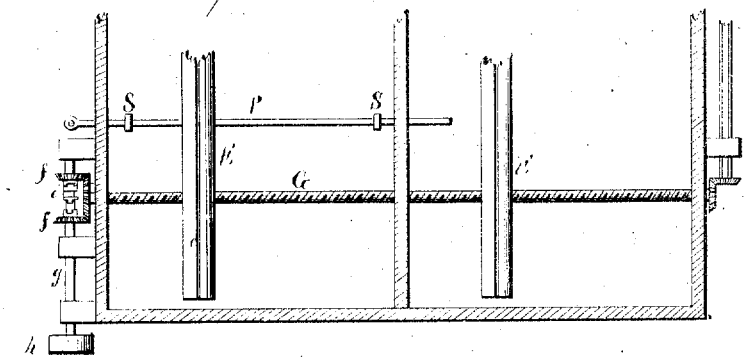
Figure 4:
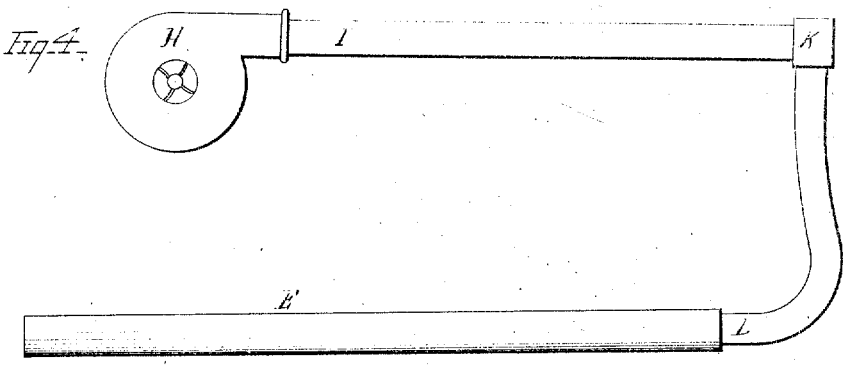

In the drawings, Figure 1 is a cross-section; Fig. 2, an elevation with a portion broken away to show the interior arrangement; Fig. 3, a horizontal section, with the separators or screens removed from place; Fig. 4, a diagram, showing the blast arrangement connected with the air-tubes; and Figs. 5, 6, 7, and 8 are detail views.

A represents the casing, in which are mounted one or more separators or screens, B B, covered with the sifting-cloth at their bottoms, and receiving a reciprocating and jarring movement, as usual. The middlings are fed through the hoppers over the separators or screens, and the purified middlings fall through into the conveyer-boxes C C, and are conveyed off by the ordinary screw-conveyers D D. Beneath the separators or screens are located air-tubes E E, which are mounted on screws G G, so that, by turning said screws first in one direction and then the other, said air-tubes receive a reciprocating traveling motion beneath the separators, and pass a blast of air through their meshes.

I prefer to locate the air-tubes lengthwise of the separators, so that their travel will be crosswise of the same; but, if desired, they may be located in the opposite direction, so as to travel longitudinally with the separators. These air-tubes are made each with an enlarged body or base, *a*, and with a contracted top, *b*, so arranged as to concentrate the blast in the upper wedging space, and discharge it in a thin sheet through the narrow slit or opening *c*, which extends the whole length of the tube.

It is necessary to pass the blast in a thin line through the meshes of the cloth, to stir up the middlings and keep the meshes clear, instead of producing a blast which is diffused over the whole surface, as in the latter case it would have to be so strong, in order to clear all the meshes at once, that it would carry off the returns and middlings which are to be sifted through, and also impair the proper diffusion of the material over the screens.

Figure 5:
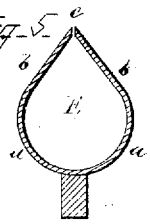
Figure 6:
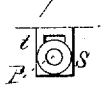
Figure 8:
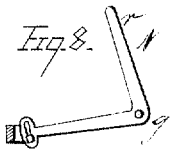
Figure 7:
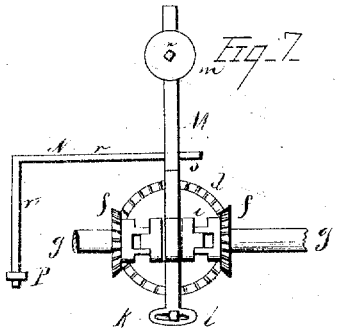

By passing the blast through in a thin line, as I do, the proper intensity of the blast may be attained without in the least disturbing the other parts of the screen, while, at the same time, the constant travel of the air-tubes will cause the blast to act on all parts of the screen in proper time. Traveling brushes have heretofore been used for this purpose; but I find this blast arrangement more effective than brushes, since the latter can produce only a rubbing action which wears the cloth, and is frequently ineffectual to clean the meshes, and can produce no stirring up of the mass on top of the screens. The air-tubes are not only more effective in cleaning the meshes, but the blast raises and stirs up the middlings so that they fall lightly over the sifting-cloth, and the light fibrous matters are so raised, lightened up, and elevated above the middlings, that they are readily drawn off by the suction-fan, which is employed on top of the machine, as usual. By this means a more effectual separation of the middlings is produced than has heretofore been the case, and a much more rapid action is attained, and the middlings and returns which fall through are of a better quality, for the reason that they are more free from fiber and light bran. This lightening up of the material also causes the middlings, which are heavier than the fibrous mass, to fall first, by reason of their greater specific gravity, so that the action is greatly facilitated thereby. The form of the air-tube shown in Fig. 5 is the best, but any form may be employed which will concentrate the air at the top and pass it through a narrow opening or slit to reach the screens, and in close proximity to the screens. At any point on the machine is located a blower-fan, or other device, H, Fig. 4, for supplying the blast. A tube, I, extends from the mouth of the blower, and communicates with a cross-tube, K. Flexible pipes L L extend from the cross-tube and connect with the ends of the air-tubes E E. These flexible pipes allow the movements of the air-tubes E E without impediment, and insure the necessary supply of air to produce the blast. They may connect the air-tubes at the ends, as shown, or at any intermediate point. A valve is used to regulate the blast. Instead of flexible pipes, stiff pipes might be used, attached to a band or slide which covers one side of an air receptacle or spout; said band or slide receiving corresponding motion with the travel of the air-tube E. One of the screws G has a bevel-gear, *d*, at one end with which engage, on opposite sides, bevel-pinions *f f*. These pinions turn loosely on a short shaft, *g*, on the end of which is situated a pulley, *h*, by which power is applied by a band. Between pinions *f f* rests a clutch, *i*, which slides freely endwise, and has the usual couplings to connect with corresponding notches of the pinion-hubs. Motion is imparted to shaft *g*, and transferred to screw G by wheels *f d*, and the shifting of the clutch from one side to the other reverses the motion. The construction of the clutch-coupling, so far as above described, is in common use. With the clutch *i* connects the forked lever M, the fork or loop of which rests in the groove of the clutch, with suitable pivot-bearings. The end of the lever below the fork extends downward a suitable distance, and has a head with a slot, K, concentric with the bearings of the fork in the groove, and through this slot passes a stop-bolt, *l*. The lever extends up some distance above the fork, and has a sliding weight, *m*, thereon held by a set-screw, *n*. At a little distance above the fork, the lever also has an angular shoulder, *o*, on which rests the outer end of an elbow, N. The end of the elbow is also formed with a head, in which is a slot, *p*, concentric with the pivot *q* of the elbow, Fig. 8. The opposite arm *r* of the elbow is carried outward of sufficient length when it is turned vertically downward, as shown at *r'*, Fig. 7, and jointed to the end of a rod, P, which runs horizontally inward through the casing beneath the air-tubes a suitable distance, and rests loosely, so that it can receive end movement. On this rod are two rigid stops, *s s*, and on the bottom of one of the air-tubes is a forked plate, *t*, which embraces the rod, as shown in Fig. 6.

The operation is as follows: Motion being given, the screws G G are run in one direction till the air-tubes nearly reach the side of the separators or screens. The forked plate *t* then strikes the top plate *s* on that side, thereby drawing the rod P back, and this rod, acting through the medium of elbow N, gradually raises the lever M to a vertical position. As soon as it passes the vertical line it drops over on the other side by its own gravity, and thereby shifts the clutch *i* to the opposite side, and engages with the other pinion *f*. In the reversed movement of the screws, the same shifting device acts by the striking of the forked lever *t* with the other stop *s*. The action is thus automatic.

An essential feature in the shifting action is the slots *k p*, by which the lever is allowed to fall far enough before striking to give an impetus sufficient to change the clutch from one side to the other. This could not be done if the latter commenced to act upon the clutch as soon as it passed the dead-center, owing to the friction.

If desired, the air-tubes E E may be operated by other means—for instance, double-threaded screws O P, which carry them to the length of the travel by one thread, and then carry them back by the other, the screws being continuous in their rotation in one direction; or an endless chain, rope, or cord may be employed by passing around pulleys, and carrying the tubes either by a reciprocating or continuous movement. In the latter case a loop or stirrup may be attached to the chain which rests in the loop, the latter being long enough to allow the pin to pass over the pulleys, and give the reverse movement.

My invention contemplates the employment of a movable or traveling blast beneath the screen, instead of a stationary blast, for the purposes set forth, the said moving or traveling blast being beneath the screen, and delivering itself against the under side thereof in a direction contrary to that direction which the middlings take in falling through the screen.

I do not claim, broadly, here the combination, with a screen or shaker, of a suction above and an air-blast below the same, as that is the subject-matter of a previous application of mine.

Having thus described my invention, what I claim is—

1. The combination of traveling or moving air-tube or tubes E E with the separator or separators B B, the said tube or tubes situated beneath the said separators.

2. In combination with the traveling air-tube or tubes E E, the pipe or pipes L L, and a blower, fan, or other device for forcing air through the pipes, as herein set forth and shown, and for the purpose specified.

3. The combination, with the screws G G and with the clutch-coupling, of the rod P provided with stops *s s*, the elbow N and lever M provided with the stops *k p*, the whole arranged and operating as herein described.

4. The combination, with a screen that has a suction-fan over it, of mechanism, substantially as described, whereby the blast from a blower-fan is made to move or travel beneath the screen, and direct the blast successively against different portions of the under side thereof.

In testimony that I claim the foregoing, witness my hand.

EDMUND N. LACROIX.

Witnesses:
WELLS W. LEGGETT,
EDM. F. BROWN,